Jan. 8, 1952 M. L. SMALLEGAN 2,581,725
POULTRY FEEDER
Filed Aug. 10, 1950

INVENTOR
MARVIN L. SMALLEGAN
BY
Rice and Rice
ATTORNEYS

Patented Jan. 8, 1952

2,581,725

UNITED STATES PATENT OFFICE 2,581,725

POULTRY FEEDER

Marvin L. Smallegan, Zeeland, Mich., assignor to Automatic Poultry Feeder Company, Zeeland, Mich., a corporation of Michigan Application August 10, 1950, Serial No. 178,680

2 Claims. (Cl. 198—168)

The present invention relates to poultry feeders and more particularly to a modification of the poultry feeder illustrated and described in the applications for Letters Patent of the United States filed by Richard A. DeWitt on June 15, 1949, Serial No. 99,169 and filed by myself on March 2, 1950, Serial No. 147,281.

The primary objects of the instant invention are to provide a poultry feeder of the general character above indicated whose conveying chain lies in a pair of parallel flat positions for most of its length; to provide such a poultry feeder whose trough is in one length for use in a relatively narrow poultry house rather than rectangular in form such as are used in larger poultry houses; to provide such a poultry feeder which is highly efficient in its intended use; and, to provide such a poultry feeder which is reasonably economical in manufacture.

An illustrative embodiment of the invention is shown in the accompanying drawing, wherein.

Figure 1:
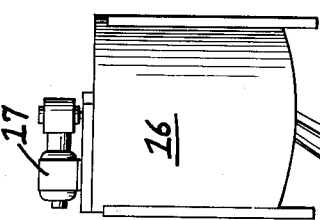
Figure 1 is a perspective view of the poultry feeder showing the feed feeding hopper which hopper is not part of the invention.

Referring then to the drawing wherein like parts of the poultry feeder shown are designated by the same numerals in the several views, the same comprises an elongated U-shaped trough 10 whose opposite ends are each adjustably elevatedly seated between a pair of spaced vertically disposed legs 11, the bottom of each leg being secured to a transverse foot 12.

Each end of the trough 10 is provided with a horizontally disposed sprocket wheel 13 secured to a shaft 14 whose lower end is rotatable in the floor of the trough and a sprocket chain 15 carried between the spaced sprocket wheels 13 is adapted to travel feed admitted to the trough 10 from the hopper 16 adjacent opposite lengths of the trough.

Figure 2:
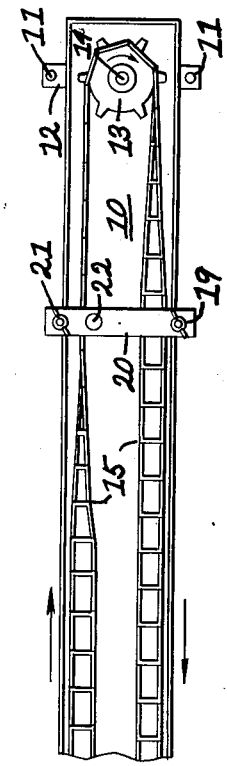
Figure 2 is a fragmentary top plan view of the poultry feeder.

A suitable source of energy such as an electric motor 17 mounted on the hopper 16 is operatively connected to one of the sprocket wheel shafts 14 which motor when energized rotates its sprocket wheel 13 to effect travel of the sprocket chain 15 within the trough 10 and as indicated by the arrows in Figure 2.

Figure 3:
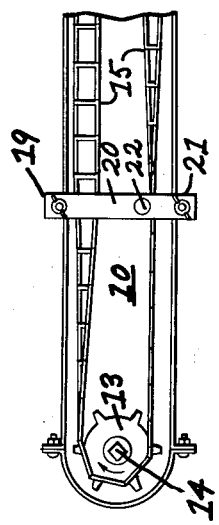
Figure 3 is a bracketed fragmentary perspective view thereof.
Figure 3:
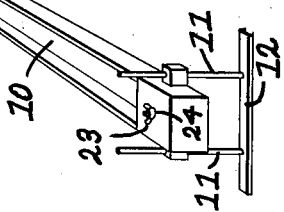

The sprocket chain 15 lies flat adjacent the parallel lengths of the trough 10 for most of its two parallel lengths as shown in Figure 2 and means for turning the sprocket chain edgewise at each end of the trough comprises a U-shaped member 18 each of whose legs 19 are provided with screw threads, all as best viewed in Figure 3.

This U-shaped member 18 is adapted to be slipped under the trough adjacent each end thereof and a bar 20, apertured at its opposite ends, is slipped over the screw threaded legs of the U-shaped member which bar is tightly secured above opposite ends of the trough by wing nuts 21 as disclosed in Figure 2.

Each bar is provided with a depending post 22 adjacent one end thereof which post serves to turn the sprocket chain 15.

A cover plate 23 at the end of the trough 10 opposite the end of the hopper 16 is secured over the sprocket wheel 13 as by a wing nut 24 to prevent feeding poultry from being injured by the rotating sprocket wheel and sprocket chain carried thereby.

Operation

In operation and after the travel of the sprocket chain 15 has been effected by the energized motor 17, feed supplied to the trough 10 from the hopper 16 is travelled along opposite inside lengths of the trough 10 by the sprocket chain 15 as in the direction indicated by the arrows in Figure 2 and since the sprocket chain is turned edgewise at the opposite ends of the trough by the depending posts 22, feed does not reach the sprocket wheels to clog or "foul up" their rotation.

It will thus be seen that the poultry feeder herein shown and described is provided with a conveyor chain lying in a pair of parallel flat positions for most of its length along opposite sides of the trough, that it is particularly well adapted for use in a relatively narrow poultry house, that it is highly efficient in its intended use and that it is reasonably economical in manufacture.

While but one specific embodiment of the invention has been herein shown and described, it will be understood that certain details of the construction shown may be altered or omitted without departing from the spirit of the invention as the same is defined in the following claims.

I claim:

1. An elongated trough U-shaped in cross section, a rotatable sprocket wheel seated on the floor of the trough adjacent each end thereof, a sprocket chain carried by and between the sprocket wheels, a U-shaped member embracing each end of the trough inwardly of a sprocket wheel, and a bar secured to the legs of each U- shaped member and above the opposite sides of the trough having a depending post for turning the opposite parallel flat lengths of the sprocket chain edgewise that lie between the several posts.

2. An elongated trough U-shaped in cross section, a rotatable sprocket wheel seated on the floor of the trough adjacent each end thereof, a sprocket chain carried by and between the sprocket wheels, a U-shaped member embracing each end of the trough inwardly of a sprocket wheel, a bar secured to the legs of each U-shaped member and above the opposite sides of the trough having a depending post for turning the opposite parallel flat lengths of the sprocket chain edgewise that lie between the several posts, and means for rotating one of the sprocket wheels for traveling the sprocket chain.

MARVIN L. SMALLEGAN.

No references cited.